United States Patent
Yim et al.

(10) Patent No.: US 11,373,087 B2
(45) Date of Patent: Jun. 28, 2022

(54) METHOD AND APPARATUS FOR GENERATING FIXED-POINT TYPE NEURAL NETWORK

(71) Applicant: SAMSUNG ELECTRONICS CO., LTD., Suwon-si (KR)

(72) Inventors: Han-young Yim, Suwon-si (KR); Do-yun Kim, Gwacheon-si (KR); Byeoung-su Kim, Hwaseong-si (KR); Nak-woo Sung, Yongin-si (KR); Jong-han Lim, Seoul (KR); Sang-hyuck Ha, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 923 days.

(21) Appl. No.: 16/033,796

(22) Filed: Jul. 12, 2018

(65) Prior Publication Data
US 2019/0130255 A1     May 2, 2019

(30) Foreign Application Priority Data
Nov. 2, 2017    (KR) ........................ 10-2017-0145374

(51) Int. Cl.
*G06N 3/08*       (2006.01)
*G06N 20/00*     (2019.01)
*G06N 3/04*       (2006.01)

(52) U.S. Cl.
CPC ......... *G06N 3/0472* (2013.01); *G06N 3/0454* (2013.01); *G06N 3/0481* (2013.01); *G06N 3/08* (2013.01); *G06N 20/00* (2019.01)

(58) Field of Classification Search
None
See application file for complete search history.

(56) References Cited

U.S. PATENT DOCUMENTS 7,398,259 B2    7/2008   Nugent
7,469,237 B2    12/2008   Cooper
(Continued)

FOREIGN PATENT DOCUMENTS

CN         1922656 A    *   2/2007           G10L 19/032

OTHER PUBLICATIONS

E. H. Lee, D. Miyashita, E. Chai, B. Murmann and S. S. Wong, "LogNet: Energy-efficient neural networks using logarithmic computation," 2017 IEEE International Conference on Acoustics, Speech and Signal Processing (ICASSP), 2017, pp. 5900-5904, doi: 10.1109/ICASSP.2017.7953288. (Year: 2017).*

Dong-Chui Park and Young-June Woo, "Weighted centroid neural network for edge preserving image compression," in IEEE Transactions on Neural Networks, vol. 12, No. 5, pp. 1134-1146, Sep. 2001, doi: 10.1109/72.950142. (Year: 2001).*
(Continued)

*Primary Examiner* — Kakali Chaki
*Assistant Examiner* — Johnathan R Germick
(74) *Attorney, Agent, or Firm* — Sughrue Mion, PLLC

(57) ABSTRACT

A method of generating a fixed-point type neural network by quantizing a floating-point type neural network, includes obtaining, by a device, a plurality of post-activation values by applying an activation function to a plurality of activation values that are received from a layer included in the floating-point type neural network, and deriving, by the device, a plurality of statistical characteristics for at least some of the plurality of post-activation values. The method further includes determining, by the device, a step size for the quantizing of the floating-point type neural network, based on the plurality of statistical characteristics, and determining, by the device, a final fraction length for the fixed-point type neural network, based on the step size.

18 Claims, 12 Drawing Sheets

(56) References Cited

U.S. PATENT DOCUMENTS

| | | |
|---|---|---|
| 8,086,052 B2 | 12/2011 | Toth et al. |
| 8,156,057 B2 | 4/2012 | Nugent |
| 8,694,449 B2 | 4/2014 | Weng et al. |
| 9,224,089 B2 | 12/2015 | Majumdar et al. |
| 10,789,734 B2* | 9/2020 | Pan ................ G06K 9/6262 |
| 2008/0301075 A1 | 12/2008 | Bolt et al. |
| 2014/0258195 A1 | 9/2014 | Weng et al. |
| 2015/0372805 A1 | 12/2015 | Yoon |
| 2016/0293167 A1 | 10/2016 | Chen et al. |
| 2016/0328644 A1 | 11/2016 | Lin et al. |
| 2016/0328645 A1 | 11/2016 | Lin et al. |
| 2016/0328646 A1* | 11/2016 | Lin ................ G06V 10/454 |
| 2016/0328647 A1 | 11/2016 | Lin et al. |

OTHER PUBLICATIONS

Wang, Jichen & Lin, Jun & Wang, Zhongfeng. (2017). Efficient Hardware Architectures for Deep Convolutional Neural Network. IEEE Transactions on Circuits and Systems I: Regular Papers. pp. 1-13. 10.1109/TCSI.2017.2767204. (Year: 2017).*

K. Hwang and W. Sung, "Fixed-point feedforward deep neural network design using weights +1, 0, and −1," 2014 IEEE Workshop on Signal Processing Systems (SiPS), 2014, pp. 1-6, doi: 10.1109/SiPS.2014.6986082. (Year: 2014).*

Sungho Shin and Yoonho Boo and Wonyong Sung (2017). Fixed-point optimization of deep neural networks with adaptive step size retraining. CoRR, abs/1702.08171. (Year: 2017).*

Suyog Gupta and Ankur Agrawal and Kailash Gopalakrishnan and Pritish Narayanan (2015). Deep Learning with Limited Numerical Precision. CoRR, abs/1502.02551. (Year: 2015).*

* cited by examiner

FIG. 4

<FLOATING POINT>

$$a \times 2^b$$

Sign | Exponent (8 bits) | Fraction (23 bits)
0 | 01111100 | 01000000000000000000000 = 0.15625

(bit index) 31 30 ... 23 22 ... 0

210

<FIXED POINT>

220

Qm.n
- Q3.4    1 sign bit, 3 integer, 4 factional bits
- Q1.30    32 bits in total
- Q15.16    32 bits in total

- Bit width: 1+m+n
- Fraction length: n

−0.0625, −8.0000, 7.9375, 0.0000

[sign] 1 bit | [exponent] m bit | [fraction] n bit

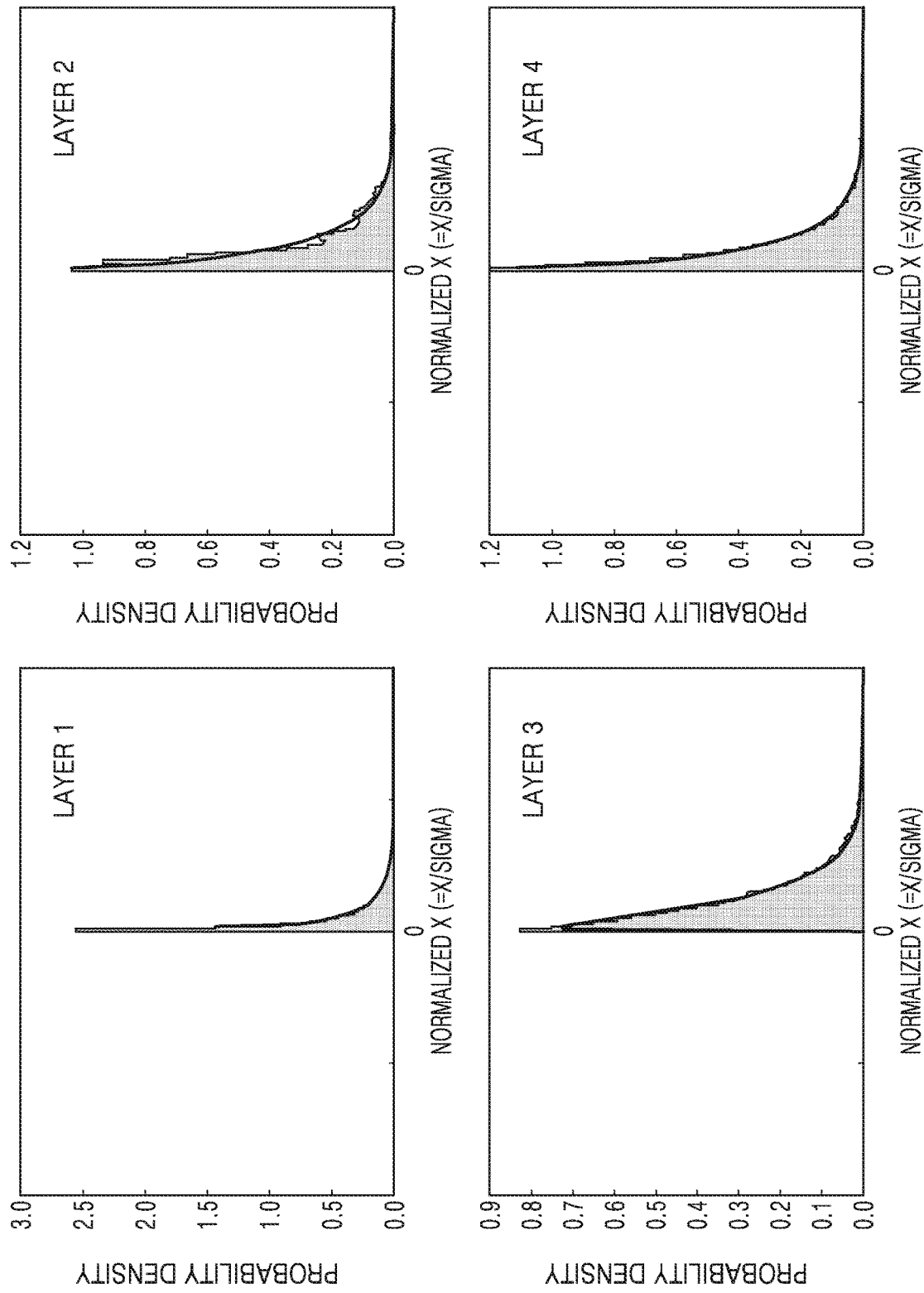

METHOD AND APPARATUS FOR GENERATING FIXED-POINT TYPE NEURAL NETWORK

CROSS-REFERENCE TO RELATED APPLICATION

This application claims priority from Korean Patent Application No. 10-2017-0145374, filed on Nov. 2, 2017, in the Korean Intellectual Property Office, the disclosure of which is incorporated herein by reference in its entirety.

BACKGROUND

1. Field

Methods and apparatuses consistent with example embodiments relate to a neural network, and more particularly, to a method and an apparatus for generating a fixed-point type neural network.

2. Description of Related Art

A neural network refers to a computational architecture that models a biological brain. Recently, with the development of neural network technology, various kinds of electronic systems have been actively studied for analyzing input data and extracting valid information, using a neural network device.

The neural network device may use a large amount of computations for complex input data. In order for the neural network device to analyze high-quality input in real time and extract information, technology capable of efficiently processing neural network operations may be used. Low-power and high-performance embedded systems such as smart phones have limited resources and may use techniques that may minimize a loss of accuracy while reducing the amount of computations used to process complex input data.

SUMMARY

According to example embodiments, there is provided a method of generating a fixed-point type neural network by quantizing a floating-point type neural network, the method including obtaining, by a device, a plurality of post-activation values by applying an activation function to a plurality of activation values that are received from a layer included in the floating-point type neural network, and deriving, by the device, a plurality of statistical characteristics for at least some of the plurality of post-activation values. The method further includes determining, by the device, a step size for the quantizing of the floating-point type neural network, based on the plurality of statistical characteristics; and determining, by the device, a final fraction length for the fixed-point type neural network, based on the step size.

According to example embodiments, there is provided a non-transitory, computer-readable medium comprising instructions that when executed cause a processor to perform a method of selecting, by a device, a group of a plurality of post-activation values by applying an activation function to a plurality of activation values that are received from a layer of a pre-trained neural network on a floating-point basis, and deriving, by the device, a plurality of parameters for a generalized gamma distribution, based on the group of the plurality of post-activation values. The method further includes determining, by the device, a step size for the quantizing of the pre-trained neural network, based on the plurality of parameters, and determining, by the device, a fraction length for the fixed-point type neural network, based on the step size.

According to example embodiments, there is provided a device including a memory configured to store a program, and a processor configured to generate a fixed-point type neural network by quantizing a floating-point type neural network, by executing the program to obtain a plurality of post-activation values by applying an activation function to a plurality of activation values that are received from a layer included in the floating-point type neural network, and derive a plurality of statistical characteristics for at least some of the plurality of post-activation values. The processor is further configured to execute the program to determine a step size for the quantizing of the floating-point type neural network, based on the plurality of statistical characteristics, and determine a final fraction length for the fixed-point type neural network, based on the step size.

BRIEF DESCRIPTION OF THE DRAWINGS

FIG. 4 is a view of a floating point and a fixed point;

FIG. 6B are views of derivation of statistical characteristics for at least some of post-activations, according to example embodiments.

DETAILED DESCRIPTION OF THE EXAMPLE EMBODIMENTS

Figure 1:
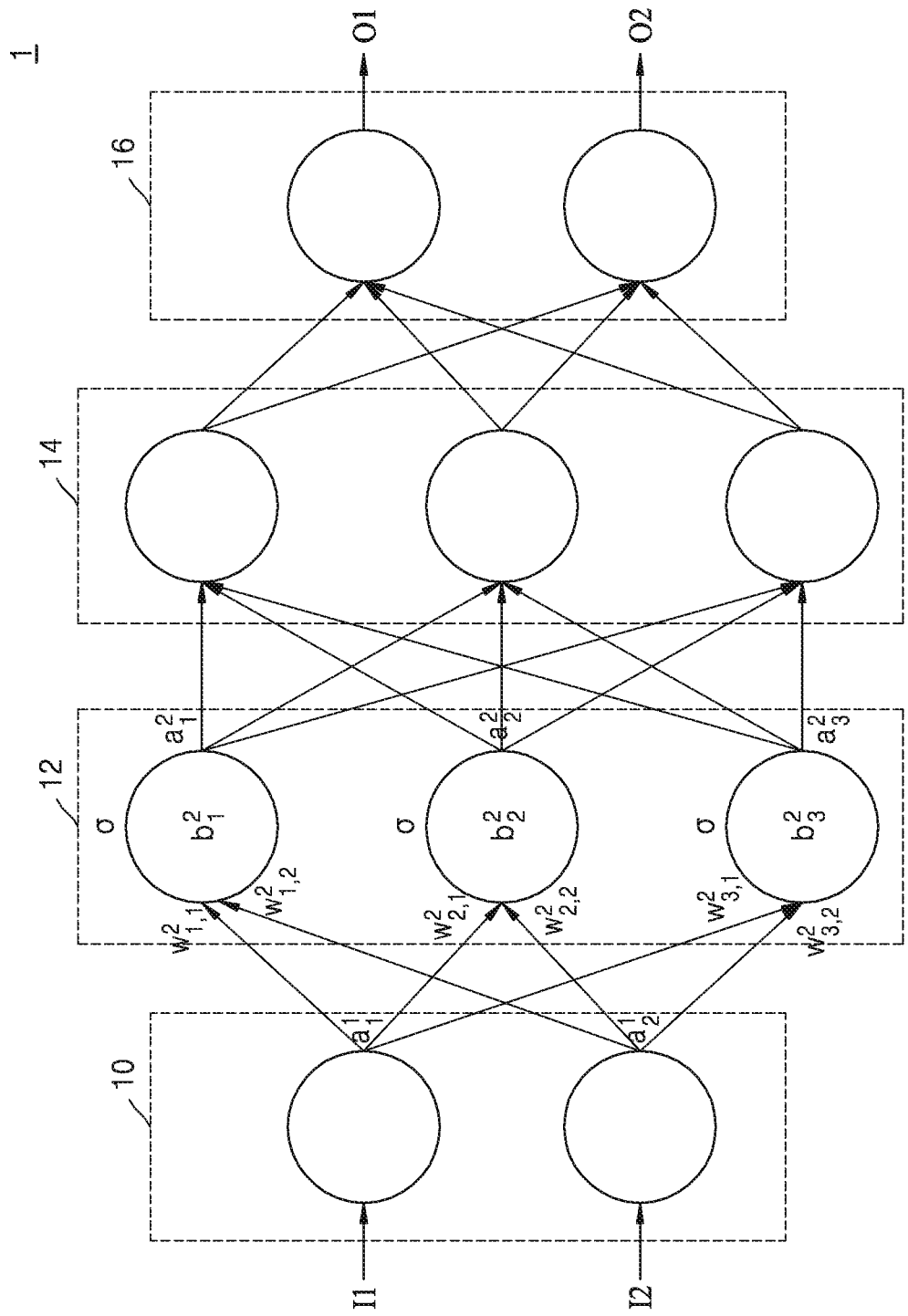
FIG. 1 is a view of a neural network according to example embodiments.

FIG. 1 is a view of a neural network 1 according to example embodiments.

Referring to FIG. 1, the neural network 1 may have a structure including an input layer 10, first and second hidden layers 12 and 14, and an output layer 16. The neural network 1 may perform a computation based on received input data (e.g., I1 and I2) and generate output data (e.g., O1 and O2) based on a result of the computation.

The neural network 1 may be a deep neural network (DNN) or n-layers neural networks including two or more hidden layers. For example, as illustrated in FIG. 1, the neural network 1 may be a DNN including the input layer 10, the first and second hidden layers 12 and 14, and the output layer 16. The DNN may include, but is not limited to, convolutional neural networks (CNN), recurrent neural networks (RNN), deep belief networks, and restricted Boltzmann machines.

If the neural network 1 has a DNN structure, the neural network 1 may handle complex data sets because the neural network 1 includes more layers from which valid information may be extracted. The neural network 1 is shown as including the four layers, i.e., the input layer 10, the first and second hidden layers 12 and 14, and the output layer 16, but this is an example. The neural network 1 may include fewer or more layers. In addition, the neural network 1 may include layers of various structures different from those shown in FIG. 1.

Each of the input layer 10, the first and second hidden layers 12 and 14, and the output layer 16 included in the neural network 1 may include a plurality of neurons. The neurons may correspond to a plurality of artificial nodes, known as processing elements (PEs), units, or similar terms. For example, as illustrated in FIG. 1, the input layer 10 may include two neurons (nodes), and each of the first and second hidden layers 12 and 14 may include three neurons (nodes). However, this is only an example, and each of the layers included in the neural network 1 may include various numbers of neurons (nodes).

The neurons included in each of the layers included in the neural network 1 may be connected to each other to exchange data. One neuron may receive and compute data from other neurons and output a result of the computation to the other neurons.

An input and output of each of the neurons (nodes) may be referred to as input activation and output activation. That is, activation may be an output of one neuron, and may be a parameter corresponding to an input of neurons included in a next layer. Each of the neurons may determine their activation based on activations and weights received from neurons included in a previous layer. A weight is a parameter used to calculate output activation in each neuron, and may be a value allocated to a connection relationship between neurons.

Each of the neurons may be processed by a computational unit or processing element that receives an input and outputs activation, and the input/output of each of the neurons may be mapped. For example, $\sigma$ is an activation function, and $w_{j,k}^{i}$ is a weight value from a $k^{th}$ neuron included in an $(i-1)^{th}$ layer to a $j^{th}$ neuron included in an $i^{th}$ layer. $b_j^i$ is a bias value of the $j^{th}$ neuron included in the $i^{th}$ layer, and $a_j^i$ is activation of the $j^{th}$ neuron of the $i^{th}$ layer, that is, post-activation. The post-activation $a_j^i$ may be calculated using the following Equation 1.

$$a_j^i = \sigma\left(\sum_k (w_{j,k}^i \times a_k^{i-1}) + b_j^i\right) \quad \text{[Equation 1]}$$

As illustrated in FIG. 1, post-activation of a first neuron of the first hidden layer 10 may be denoted as $a_1^2$. In addition, $a_1^2$ may have a value of $a_1^2=\sigma(w_{1,1}^2 \times a_1^1 + w_{1,2}^2 \times a_2^1 + b_1^2)$ according to Equation 1. In other words, post-activation may be a value obtained by applying an activation function to a sum of the activations received from the previous layer. However, Equation 1 is only an example for explaining the activation and weights used for processing the data in the neural network 1, and is not limited thereto.

As described above, in the neural network 1, numerous data sets are exchanged between a plurality of mutually connected neurons, and undergo many computation processes as they pass through layers. Therefore, there is a need for techniques that may minimize a loss of accuracy while reducing the amount of computations used to process complex input data.

Figure 2:
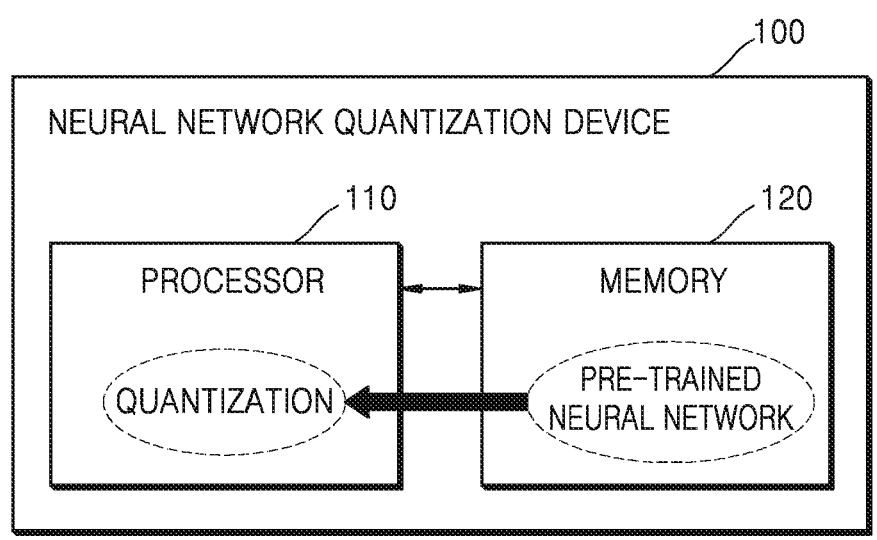
FIG. 2 is a block diagram of a hardware configuration of a neural network quantization device, according to example embodiments.

FIG. 2 is a block diagram of a hardware configuration of a neural network quantization device 100, according to example embodiments.

Referring to FIG. 2, the neural network quantization device 100 may include a processor 110 and a memory 120. Only components related to the present example embodiments are shown in the neural network quantization device 100 of FIG. 2. Therefore, it will be understood that the neural network quantization device 100 may further include general components other than the components in FIG. 2 to those of ordinary skill in the art.

The neural network quantization device 100 may correspond to a computing device having various processing functions such as generating a neural network, training (or learning) a neural network, quantizing a floating-point type neural network into a fixed-point type neural network, or retraining a neural network. For example, the neural network quantization device 100 may be implemented by various types of devices such as a personal computer (PC), a server device, and a mobile device.

The processor 110 may perform a function for controlling the neural network quantization device 100. For example, the processor 110 may control the neural network quantization device 100 by executing programs stored in the memory 120 in the neural network quantization device 100. The processor 110 may be implemented by, but is not limited to, a central processing unit (CPU), a graphics processing unit (GPU), an application processor (AP), a digital signal processor (DSP), or the like provided in the neural network quantization device 100.

The memory 120 is hardware for storing various data processed in the neural network quantization device 100. For example, the memory 120 may store data processed in the neural network quantization device 100 and data to be processed. Furthermore, the memory 120 may store applications, drivers, and the like to be driven by the neural network quantization device 100.

The memory 120 may be dynamic random access memory (DRAM), but is not limited thereto. The memory 120 may include either one or both of volatile memory and nonvolatile memory. The nonvolatile memory may include read only memory (ROM), programmable ROM (PROM), electrically programmable ROM (EPROM), electrically erasable and programmable ROM (EEPROM), a flash memory, phase-change RAM (PRAM), magnetic RAM (MRAM), resistive RAM (RRAM), or ferroelectric RAM (FRAM). The volatile memory may include DRAM, static RAM (SRAM), synchronous DRAM (SDRAM), or PRAM. In example embodiments, the memory 120 may include any one or any combination of a hard disk drive (HDD), a solid state drive (SSD), compact flash (CF), secure digital (SD), micro secure digital (Micro-SD), mini secure digital (Mini-SD), extreme digital (xD), or a memory stick.

The processor 110 may repeatedly train (learn) a given initial neural network to generate a trained neural network. The initial neural network may have parameters of a floating-point type, for example, parameters of 32-bit floating-point precision, to secure processing accuracy of the neural network.

The floating-point type parameters may include, for example, various types of data that are input/output to/from a neural network, such as input/output activations, weights, and biases of a neural network. As the repetitive training of the neural network progresses, the floating-point type parameters of the neural network may be tuned to compute a more accurate output for a given input.

A floating point may use a relatively large amount of computations and a high memory access frequency compared to a fixed point. Therefore, in a mobile device such as a smart phone, a tablet PC, a wearable device or the like and an embedded device having relatively low processing performance, the processing of a neural network having floating-point type parameters may not be smooth. Thus, to drive a neural network with acceptable accuracy loss while sufficiently reducing the amount of computations in such devices, the floating-point type parameters that are processed in the neural network may be quantized. Parameter quantization may mean converting a floating-point type parameter to a fixed-point type parameter.

The neural network quantization device 100 may perform quantization to convert parameters of a trained neural network into predetermined bits of a fixed-point type taking into consideration the processing performance of a device (e.g., a mobile device, an embedded device, etc.) in which a neural network is to be deployed. In addition, the neural network quantization device 100 may transmit the quantized neural network to the device to be deployed. The device in which a neural network is to be deployed may be, for example, an autonomous vehicle that performs speech recognition and image recognition using a neural network, a robot, a smart phone, a tablet device, an augmented reality (IAR) device, an Internet of Things (IoT) device, or the like.

The processor 110 may obtain data of a pre-trained neural network, using floating points stored in the memory 120. The pre-trained neural network data may be data repeatedly trained with floating-point type parameters. Neural network training may be repeatedly performed by receiving training set data as an input, and then repeatedly performed with test set data again, but is not limited thereto. The training set data is input data for training a neural network, and the test set data is input data that does not overlap the training set data and may train the neural network trained with the training set data while measuring performance thereof.

The processor 110 may analyze statistical distribution by neuron for parameter values of a floating-point type used in each neuron included in each of feature maps and kernels, from the pre-trained neural network data. The processor 110 may analyze the statistical distribution by obtaining statistics by neuron for parameter values of floating-point type activations, weights, and biases used in each neuron while a neural network is pre-trained.

The processor 110 may determine a fixed-point representation of statistical distribution by neuron that statistically covers a distribution range of parameter values based on the analyzed statistical distribution by neuron. Thus, a floating-point type neural network may be converted to a fixed-point type neural network.

According to example embodiments, the processor 110 may derive statistical characteristics for at least some of post-activations being processed in a layer, calculate a step size for quantization based on the statistical characteristics, and determine a fraction length for the fixed-point type neural network based on the step size. For example, the processor 110 may derive statistical characteristics for post-activations having a positive value among post-activations.

In example embodiments, the processor 110 may derive a plurality of parameters as statistical characteristics by statistical inference of the plurality of parameters, which curve-fit generalized gamma distribution to post-activations having a positive value processed in a layer. For example, the processor 110 may statistically estimate any one or any combination of the plurality of parameters based on one or more statistical values of the post-activations having a positive value.

In example embodiments, the processor 110 may calculate a step size, which minimizes overall distortion of a quantization level for a probability density function of post-activations, as a step size for quantization. For example, the processor 110 may calculate a step size through a closed-form equation based on the plurality of parameters.

In example embodiments, the processor 110 may derive first and second fraction lengths having different integer values based on the calculated step size, and may determine one of the first and second fraction lengths as a fraction length for a fixed point. For example, the first fraction length may be a value obtained by rounding up the fraction length corresponding to the step size. Furthermore, the second fraction length may be a value obtained by rounding down a fraction length corresponding to the step size.

The memory 120 may store, for example, neural network-related data sets processed or to be processed by the processor 110, such as untrained initial neural network data, neural network data generated during training, neural network data that has been fully trained, quantized neural network data, and the like, and may store various programs related to training algorithms, quantization algorithms, and the like of a neural network to be executed by the processor 110.

According to example embodiments, because a step size of quantization is derived based on some of post-activations processed in a layer, a non-zero mean characteristic of input data distribution may be directly applied to the quantization and asymmetric distribution of input data may be quantized. Furthermore, a fixed point-based neural network that improves quantization error and minimizes performance degradation compared to a floating point-based neural network is provided, thereby improving a memory area, a bandwidth, and power consumption.

Figure 3:
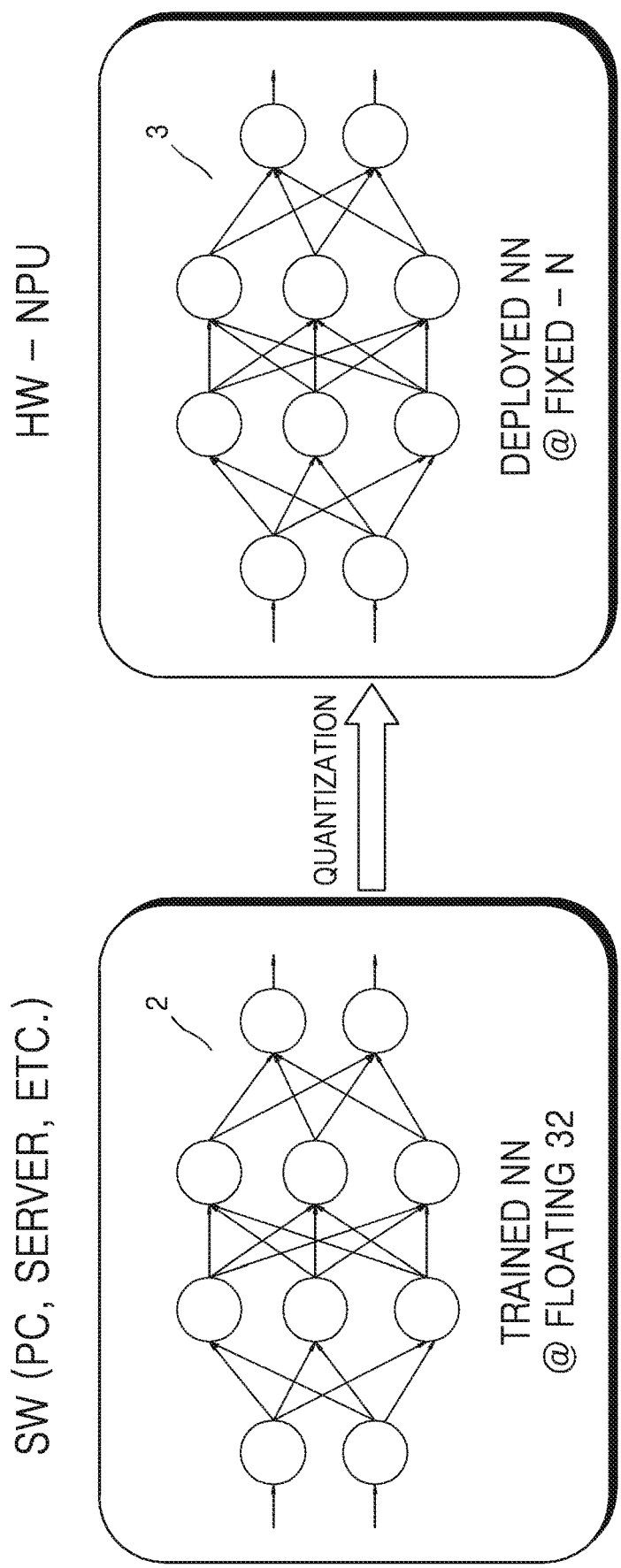
FIG. 3 is a view of how a pre-trained neural network is quantized and applied to a hardware accelerator, according to example embodiments.

FIG. 3 is a view of how a pre-trained neural network is quantized and applied to a hardware accelerator, according to example embodiments.

Referring to FIG. 3, as described above, the processor 110 (of FIG. 2) may train a neural network 2 (NN) of a floating-point type (for example, a 32-bit floating-point type) in the neural network quantization device 100 (FIG. 2) such as a PC, a server and the like (SW). The pre-trained neural network 2 itself may not be efficiently processed in a low-power or low-performance hardware (HW) accelerator due to floating-point type parameters.

Therefore, the processor 110 (of FIG. 2) of the neural network quantization device 100 (of FIG. 2) may quantize the neural network 2 of a floating-point type into a neural network 3 of a fixed-point type (for example, a 16-bit floating-point type or less). Because the hardware accelerator is dedicated hardware for driving the neural network 3 and is implemented with relatively low power or low performance, the hardware accelerator may be more suitable for fixed-point computation than floating-point computation. The hardware accelerator may be, for example, but is not limited to, a neural processing unit (NPU), a tensor processing unit (TPU), a neural engine, or the like, which is a dedicated module for driving a neural network.

The hardware accelerator for driving the quantized neural network 3 may be implemented in, but is not limited to, an independent device separate from the neural network quantization device 100 (of FIG. 2). The hardware accelerator may also be implemented in the same device as the neural network quantization device 100 (of FIG. 2).

FIG. 4 is a view of a floating point and a fixed point.

Referring to an example 210 of the floating point of FIG. 4, a floating-point value may be represented as $a \times 2^b$, where a is an exponent and b is a fraction part. For example, the floating-point value may be represented by 32 bits including 1 bit of code (i.e., a sign bit), 8 bits of the exponent, and 23 bits of the fraction part.

Next, referring to an example 220 of a fixed point, the fixed point is represented by "Qm.n," where m and n may be a natural number. In FIG. 4, "Qm.n" is an expression for describing a fixed point, and is not limited thereto. "m" is the number of bits representing the exponent, and "n" is the number of bits representing the fraction part (i.e., a fraction length). Therefore, a bit width of the fixed point is 1+m+n by summing 1 bit of code, m bits of the exponent, and n bits of the fraction part.

Because bits representing the fraction part among fixed-point bits are n bits, a fraction length is n. For example, "Q3.4" is a fixed-point value of a total of 8 bits having a 1 bit of code, 3 bits of the exponent, and 4 bits of the fraction part, "Q1.30" is a fixed-point value of a total of 32 bits having 1 bit of code, 1 bit of the exponent, and 30 bits of the fraction part, and "Q15.16" is a fixed-point value of a total of 32 bits having 1 bit of code, 15 bits of the exponent, and 16 bits of the fraction part.

Figure 5:
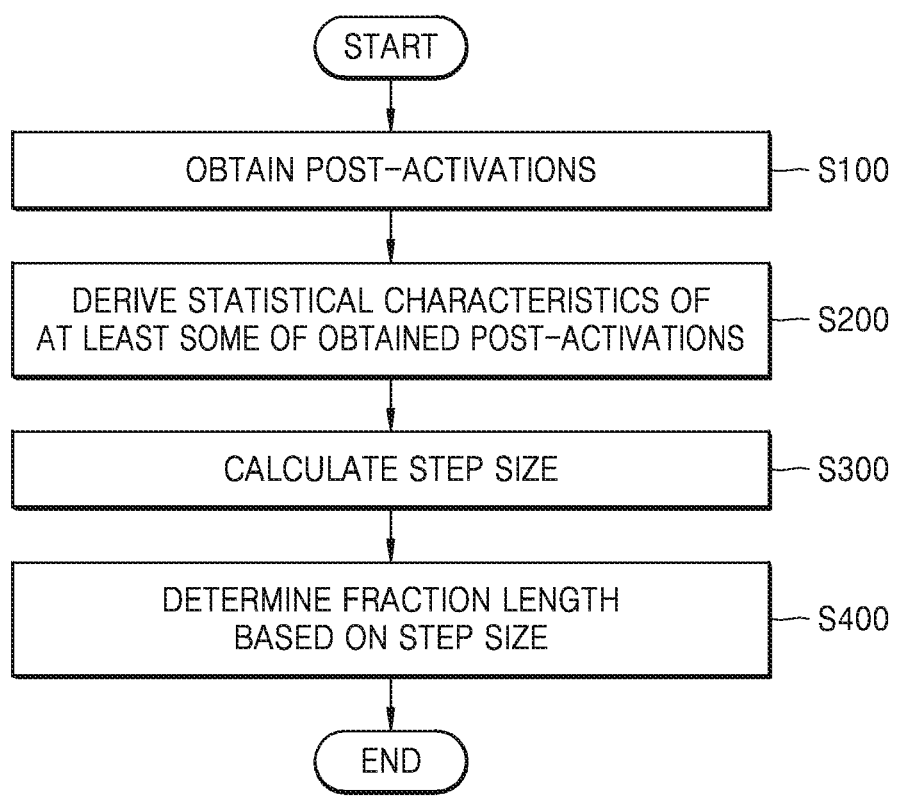
FIG. 5 is a flowchart of a method of quantizing a floating-point type neural network, according to example embodiments.

FIG. 5 is a flowchart of a method of quantizing a floating-point type neural network, according to example embodiments. The quantization method shown in FIG. 5 may be performed, for example, in the processor 110 of FIG. 2.

Referring to FIG. 5, in operation S100, the processor 110 may obtain post-activations processed in a layer included in a floating point-based neural network. Post-activation may be post-activation of a neural network that is pre-trained on a floating point basis. The post-activation may be, for example, a value obtained by applying an activation function to the sum of activations received from a previous layer. The activation function may be, for example, a step function, a sigmoid function, a hyperbolic-tangent function, or a rectified linear unit (ReLU).

Next, in operation S200, the processor 110 may derive statistical characteristics of at least some of the obtained post-activations. In example embodiments, the processor 110 may derive statistical characteristics of post-activations having a positive value among the post-activations. Furthermore, in example embodiments, the processor 110 may derive a plurality of parameters as statistical characteristics by statistical inference of the plurality of parameters, which curve-fit generalized gamma distribution to at least some of the post-activations.

Next, in operation S300, the processor 110 may calculate a step size for quantization based on the statistical characteristics (S300). The step size may be, for example, a quantization interval for floating point values. In example embodiments, the processor 110 may calculate the step size for the quantization through a closed-form equation based on a plurality of parameters derived as the statistical characteristics.

For example, the processor 110 may perform quantization on a floating-point type neural network based on N quantization levels. N may be an integer of 2 or more. The processor 110 may calculate a step size between the quantization levels, based on the N quantization levels and a plurality of parameters. In example embodiments, the processor 110 may calculate the step size through a closed-form equation based on the N quantization levels and the plurality of parameters derived as statistical characteristics.

Next, in operation S400, the processor 110 may determine a fraction length for the fixed-point type neural network based on the step size. The fraction length, that is, the allocated number of fraction bits, may be a basis of, for example, accuracy of fixed-point values and a range of floating-point values to be represented by the fixed-point values. In example embodiments, the processor 110 may derive first and second fraction lengths based on the step size, and may determine any one of the first and second fraction lengths as the fraction length for the fixed-point type neural network.

Figure 6A:
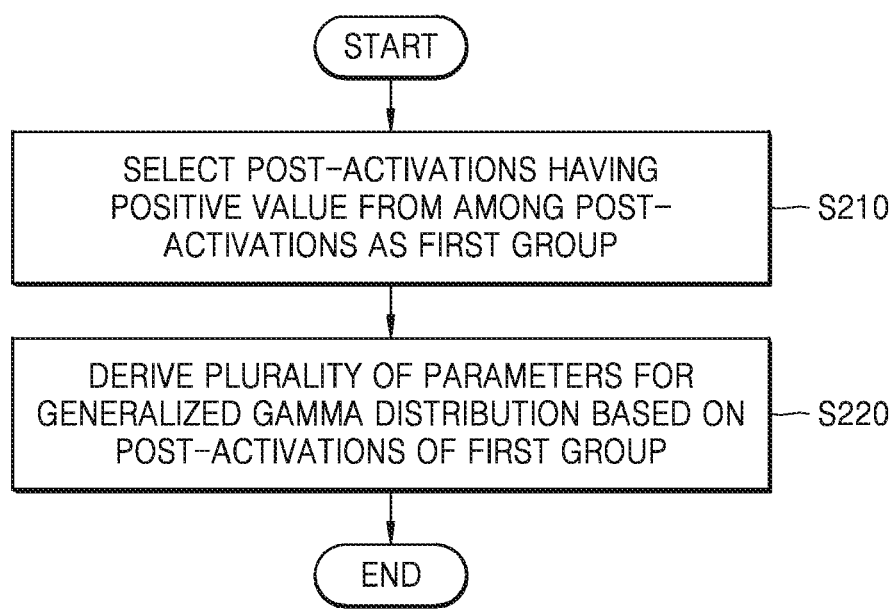
FIG. 6A is a flowchart of a method of deriving of statistical characteristics for at least some of post activations, according to example embodiments.

FIG. 6A is a flowchart of a method of deriving of statistical characteristics for at least some of post activations, and FIG. 6B are views of derivation of statistical characteristics for at least some of post-activations, according to example embodiments. FIG. 6A is a flowchart of an example of operation S200 of FIG. 5, and FIG. 6B is a graph of curve-fitting for post-activations by layer.

Referring to FIG. 6A, in operation S210, the processor 110 may select post-activations having a positive value among the post-activations as a first group. In other words, the processor 110 may select post-activations other than post-activations having a negative value and a value of 0 among the obtained post-activations as a first group.

Next, in operation S220, the processor 110 may derive a plurality of parameters for generalized gamma distribution based on the post-activations of the first group. In example embodiments, the plurality of parameters may be parameters that are a basis of curve fitting of the generalized gamma distribution to the post-activations included in the first group. In other words, a graph of the generalized gamma distribution may vary based on a plurality of parameter values. The generalized gamma distribution may be curve-fitted to the post-activations included in the first group with a relatively high degree of freedom based on the plurality of parameter values.

In example embodiments, the plurality of parameters may include α, β, λ, and μ that are a basis of the shape of the graph of the generalized gamma distribution. The processor 110 may statistically estimate a value of any one or any combination of the plurality of parameters based on the activations included in the first group. The statistical estimation may be performed based on, for example, any one or any combination of a moment utilization method, a maximum likelihood method, and a numerical calculation method.

For example, a value of any one or any combination of the plurality of parameters may be estimated based on the moment utilization method, and when α=1, a value of each of β, λ, and μ may be calculated by Equation 2.

$$\beta = \frac{m_x^2}{\sigma_x^2} - 1, \lambda = \frac{m_x}{\sigma_x^2}, \text{ and } \mu = \frac{\lambda^{m_x^2/\sigma_x^2}}{2\Gamma(m_x^2/\sigma_x^2)} \quad \text{[Equation 2]}$$

Where $m_x$ may be a mean of the post-activations included in the first group, and $\sigma_x^2$ may be variance of the post-activations included in the first group. In addition, Γ( ) may be a gamma function. In Equation 2, the equation of each parameter is described when α=1, but the present disclosure is not limited thereto. For example, when α has a value, each parameter may be derived by additionally using a higher-order moment than a third order.

FIG. 6B shows a graph of a plurality of post-activations for each layer and generalized gamma distribution that is approximated by being curve-fitted by the plurality of post-activations. An x-axis of each graph may denote normalized values of various values that the post-activations can have, and a y-axis may denote probability density.

In example embodiments, the plurality of post-activations may be post-activations having a positive value among post activities of a pre-trained neural network on a floating point basis. The processor 110 may statistically estimate α, β, λ and μ values based on the mean and variance of the plurality of post-activations to derive a graph of generalized gamma distribution that is curve-fitted to the plurality of post-activations for each layer.

Figure 7:
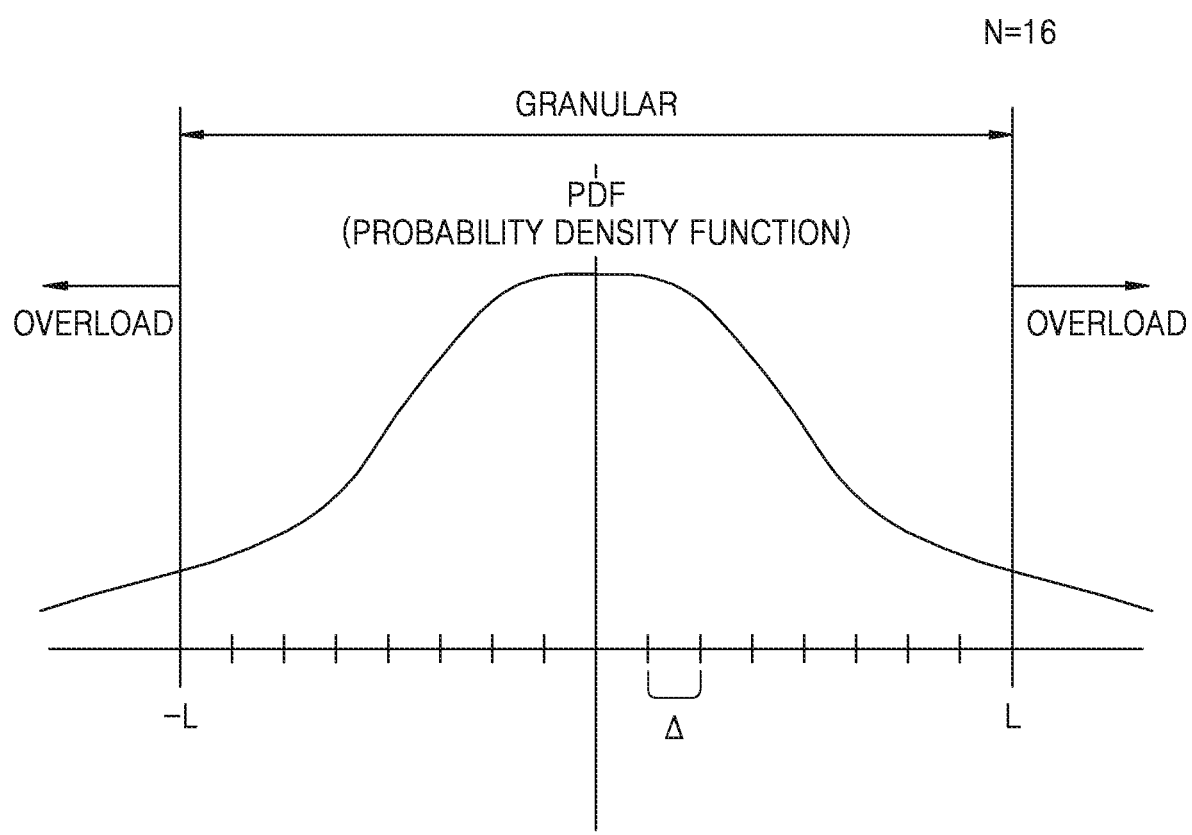
FIG. 7 is a view of step-size calculation for quantization according to example embodiments.

FIG. 7 is a view of step-size calculation for quantization according to example embodiments. FIG. 7 may be, for example, a probability density function (PDF) of post-activations output from a layer. FIG. 7 may be, for example, a view for describing operation S300 of FIG. 5.

Referring to FIG. 7, according to repetitive training of a neural network having floating-point type parameters, distribution of a unique floating-point value may be generated for each neuron included in a layer. In example embodiments, the processor 110 may obtain a statistic for post-activation for each neuron and normalize the statistic for each neuron to a PDF of generalized gamma distribution for each neuron.

The PDF may be divided into a section in which quantization is performed and an interval in which quantization is not performed. For example, an (−L, L) interval is an interval in which quantization is performed and represented by a fixed point, and other intervals may not be quantized. The (−L, L) interval may be uniformly quantized with a step size (or a quantization interval) of Δ for N quantization levels. Each of the quantization levels may be represented by $$S_i = \left(y_i - \frac{\Delta}{2}, y_i + \frac{\Delta}{2}\right)$$

and may be 1≤i≤N. The present example embodiments describe that N is 16, but is not limited thereto.

In step size calculation, overall distortion of the quantization levels for the PDF of the post-activations may be considered. The overall distortion may include, for example, both distortion in a section in which quantization is performed and distortion in a section in which quantization is not performed, among unique floating-point values generated for each neuron included in a layer. For example, the distortion in a section in which quantization is performed may be named as granular distortion, and the distortion in a section in which quantization is not performed may be named as overload distortion. In example embodiments, the overall distortion of the quantization levels for the PDF of the post-activations may be represented by Equation 3.

$$D_N(L) = D_N^{gran}(L) + D_N^{over}(L), \text{ where} \quad \text{[Equation 3]}$$

$$D_N^{gran}(L) = \sum_{i=1}^{N} \int_{S_i} (x - y_i)^2 p(x)dx,$$

-continued $$D_N^{over}(L) = 2\int_L^\infty (x - y_n)^2 p(x)dx,$$

$$y_i = -L + \left(i - \frac{1}{2}\right)\Delta$$

That is, the overall distortion of the quantization levels for the PDF of the post-activations may be derived as a sum of distortion (or granular distortion) $D_N^{gran}(L)$ in a section in which quantization is performed and distortion (or overload distortion) $D_N^{over}(L)$ in the other section. From Equation 3, it can be seen that the overall distortion is based on the step size.

In example embodiments, the processor 110 may calculate a step size, which minimizes the overall distortion of the quantization levels for the PDF of the post-activations, as a step size for quantization. As an example, the processor 110 may calculate the step size minimizing the overall distortion through a closed-form equation based on N, which is the number of the quantization levels, and a plurality of parameters (e.g., α, β, λ, and μ). For example, when the overall distortion is derived according to Equation 3, the step size minimizing the overall distortion may be derived according to Equation 4.

$$\hat{\Delta} = \frac{2\hat{L}_N}{N}, \text{ where} \quad \text{[Equation 4]}$$

$$\hat{L}_N = \left[\frac{2\ln N}{\lambda} - \left(2 - \frac{1+\beta}{\alpha}\right)\frac{\ln\ln N}{\lambda} - \frac{1}{\lambda}\ln\left(\frac{2^{1-\frac{1+\beta}{\alpha}}\alpha^2 \lambda^{\frac{1+\beta}{\alpha}}}{3\mu}\right) + \epsilon_N\right]^{\frac{1}{\alpha}},$$

and $$\epsilon_N = \frac{1}{\lambda}\ln\left[\left(1 + \frac{2\alpha\ln N}{N}\right)\left(1 + \frac{3 - 3\alpha + 2\beta}{2\alpha\ln N}\right)\right.$$

$$\left.\left(1 + \frac{1}{2\ln N}\left(\left(2 - \frac{1+\beta}{\alpha}\right)\ln\ln N + \ln\left(\frac{2^{1-(1+\beta)/\alpha}\alpha^2 \lambda^{(1+\beta)/\alpha}}{3\mu}\right)\right)\right)^{2-(1+\beta)/\alpha}\right]$$

Where $\hat{\Delta}$ may be the step size for quantization. That is, because the step size is derived from the processor 110 through the closed-form equation shown in Equation 4, the step size may be a basis for easy neural network implementation.

Figure 8:
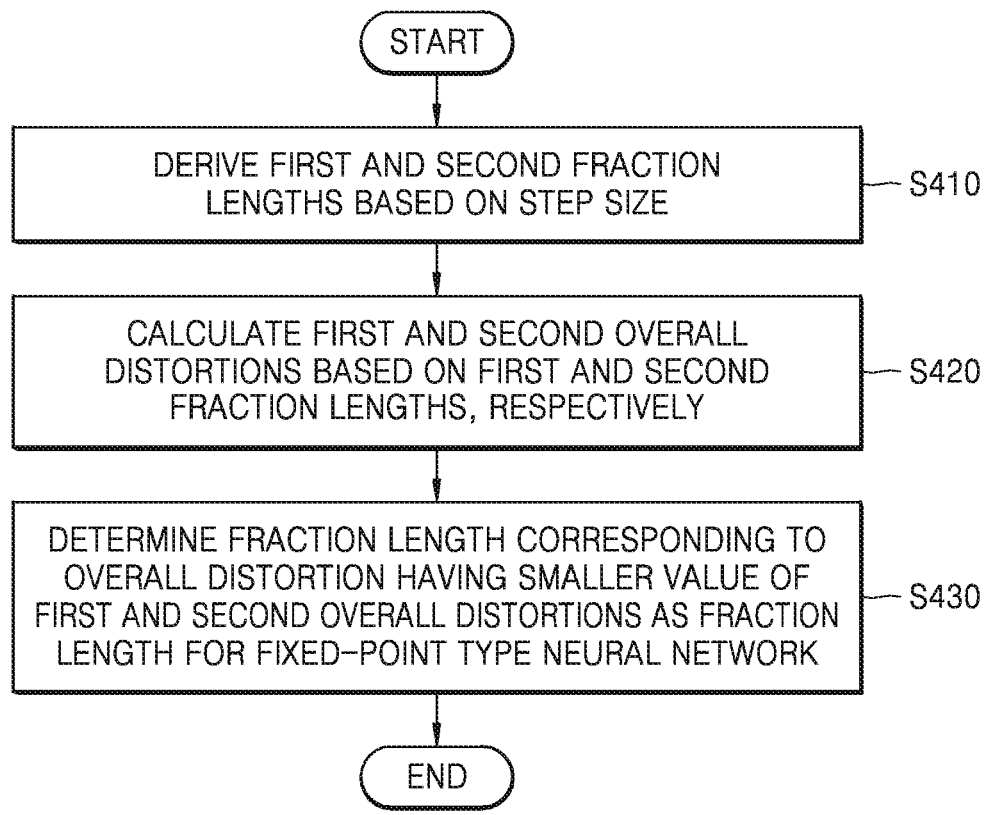
FIG. 8 is a flowchart of fraction-length determination according to example embodiments.

FIG. 8 is a flowchart of fraction-length determination according to example embodiments. FIG. 8 shows an example of operation S400 of FIG. 5.

Referring to FIG. 8, in operation S410, the processor 110 may derive the first and second fraction lengths based on a step size. The step size may be, for example, $\hat{\Delta}$ derived from Equation 4.

In example embodiments, the first fraction length may be a value obtained by rounding up a fraction length corresponding to the step size, and the second fraction length may be a value obtained by rounding down the fraction length corresponding to the step size. In more detail, when the step size is Δ derived from Equation 4, the first and second fraction lengths may be derived through Equation 5.

$$FL_{ceil} = -\text{ceil}(\log_2 \hat{\Delta}_N), FL_{floor} = -\text{floor}(\log_2 \hat{\Delta}_N) \quad \text{[Equation 5]}$$

Where $FL_{ceil}$ may be the first fraction length, and $FL_{floor}$ may be the second fraction length.

Next, in operation S420, the processor 110 may calculate first and second overall distortions based on the first and second fraction lengths, respectively. For example, the first and second overall distortions may be derived by respectively applying the first and second fraction lengths to the overall distortion equation of Equation 3. In more detail, when an overall distortion equation is Equation 3, overall distortion according to a fraction length may be represented by Equation 6.

$$\hat{D}_N(\hat{L}_N) = \frac{1}{12}\left(\frac{2\hat{L}_N}{N}\right)^2 + \frac{4\mu e^{-\lambda L_N^\alpha}}{(\alpha\lambda)^3 L_N^{3\alpha-\beta-3}}, \text{ where}$$

$$\hat{L}_N = \frac{N\hat{\Delta}_N}{2}, \hat{\Delta}_N = 2^{-FL}$$

[Equation 6]

That is, the processor 110 may derive the first overall distortion by substituting $FL_{ceil}$ of Equation 5 into FL of Equation 6, and may derive the second overall distortion by substituting $FL_{floor}$ of Equation 5 into FL of Equation 6.

Next, in operation S430, the processor 110 may determine a fraction length corresponding to overall distortion having a smaller value of the first and second overall distortions as a fraction length for a fixed-point type neural network. In other words, the processor 110 may determine a fraction length deriving smaller overall distortion of a rounding-up value and a rounding-down value for a fraction length as a fraction length for a fixed point.

Figure 9:
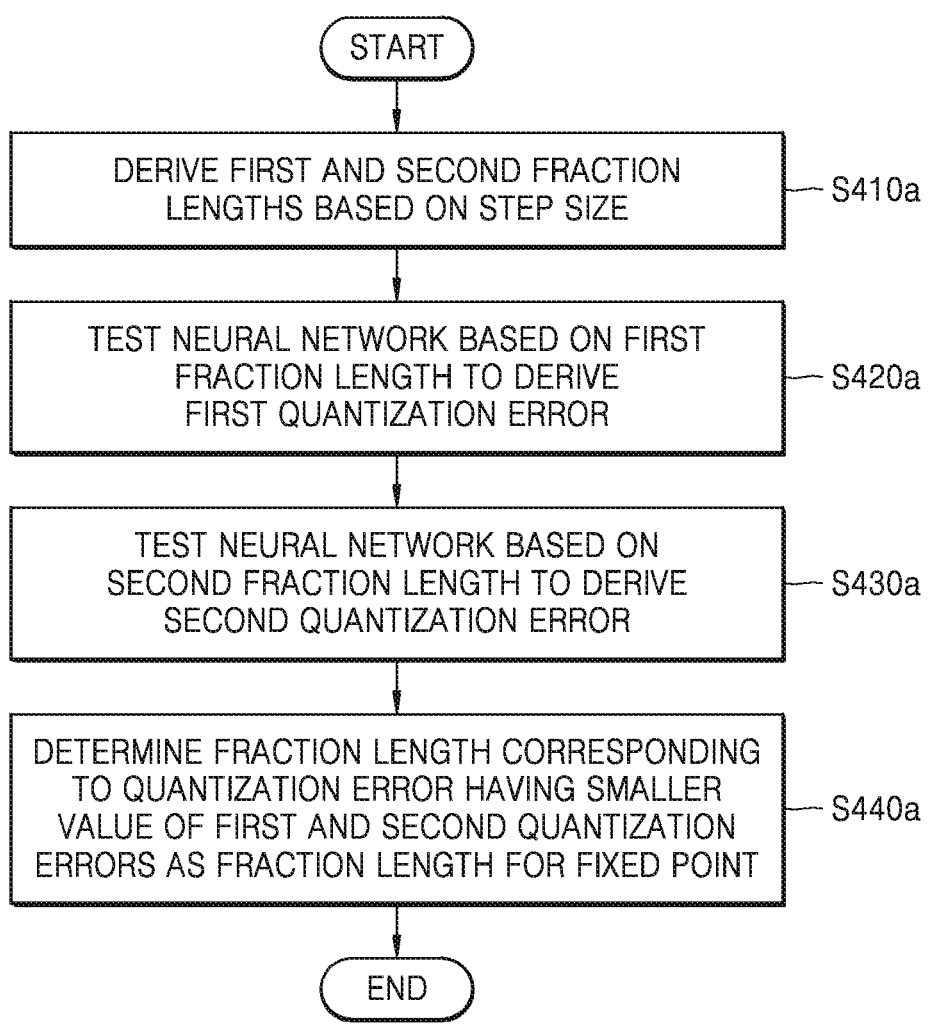
FIG. 9 is a flowchart of fraction-length determination according to example embodiments.

FIG. 9 is a flowchart of fraction-length determination according to example embodiments. FIG. 9 shows an example of operation S400 of FIG. 5. In FIG. 9, the same reference numerals as in FIG. 8 denote the same elements, and further descriptions thereof shall be omitted.

Referring to FIG. 9, in operation S410a, the processor 110 may derive the first and second fraction lengths based on a step size. In example embodiments, the first fraction length may be a value obtained by rounding up a fraction length corresponding to the step size, and the second fraction length may be a value obtained by rounding down the fraction length corresponding to the step size.

Next, in operation S420a, the processor 110 may test a neural network based on the first fraction length to derive a first quantization error. For example, the processor 110 may drive the neural network as a test by applying the first fraction length to a fraction length for a fixed point. The processor 110 may derive the first quantization error for input samples based on the test of the neural network based on the first fraction length.

Next, in operation S430a, the processor 110 may test the neural network based on the second fraction length to derive a second quantization error. For example, the processor 110 may drive the neural network as a test by applying the second fraction length to a fraction length for a fixed point. The processor 110 may derive the second quantization error for input samples based on the test of the neural network based on the second fraction length.

In present example embodiments, the processor 110 derives the first quantization error in operation S420a, and then derives the second quantization error in operation S430a. However, the present disclosure is not limited thereto. In other words, in operation S430a, the processor 110 may test the neural network based on the second fraction length to derive the second quantization error, and then in operation S420a, may test the neural network based on the first fraction length to derive the first quantization error.

Next, in operation S440a, the processor 110 may determine a fraction length corresponding to a quantization error having a smaller value of the first and second quantization errors as a fraction length for a fixed point. In other words, the processor 110 may determine a fraction length deriving a smaller quantization error, when the neural network is driven as a test, of a rounding-up value and a rounding-down value for a fraction length as a fraction length for a fixed point.

Figure 10:
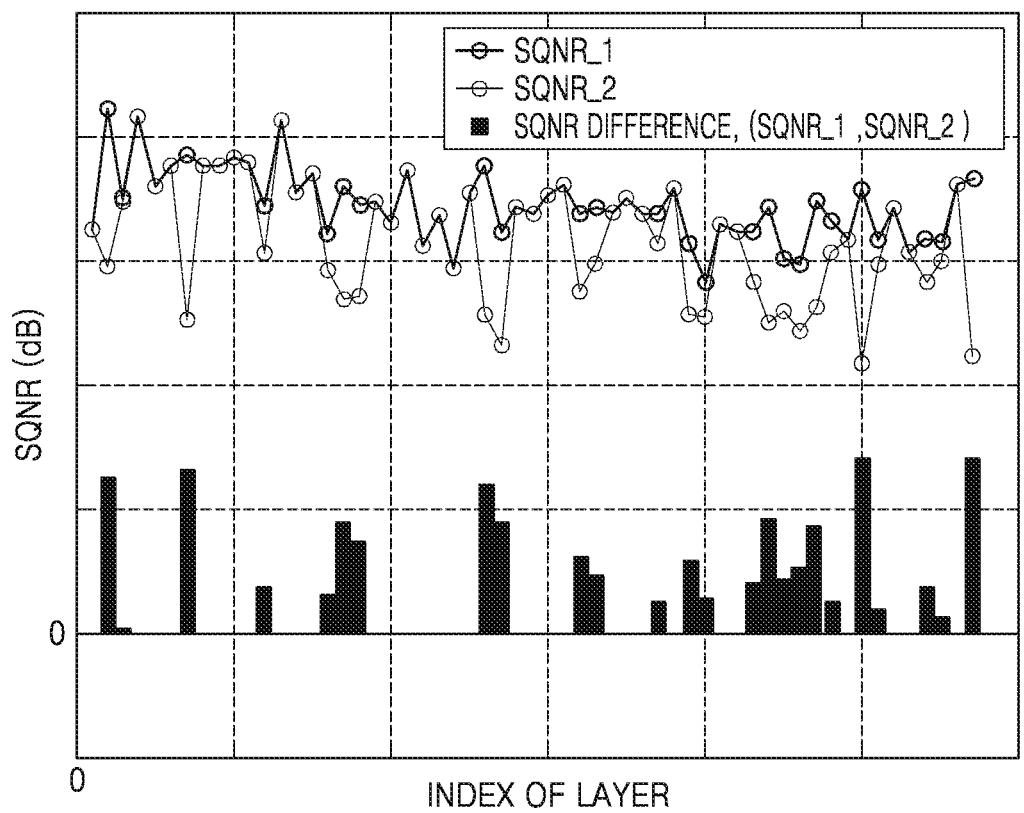
FIG. 10 is a graph of performance of each of a neural network and a comparative example, according to example embodiments.

FIG. 10 is a graph of performance of each of a neural network and a comparative example, according to example embodiments.

Referring to FIG. 10, first and second signal-to-quantization-noise ratios (SQNRs) for each layer are shown as dB scales, respectively. An SQNR is a ratio of quantization noise to an original signal, and performance of the neural network may be determined to be improved in terms of a quantization error as the SQNR increases. The SQNR may be, for example, proportional to power of the original signal and inversely proportional to quantization error power (or a squared value of a quantization error).

A first SQNR may be an SQNR based on quantization according to example embodiments, and the second SQNR may be an SQNR based on quantization according to a comparative example. Referring to FIG. 10, the first SQNR may have a tendency to have a larger value than the second SQNR. That is, when quantization is performed according to example embodiments, performance degradation may be improved in terms of a quantization error.

Figure 11:
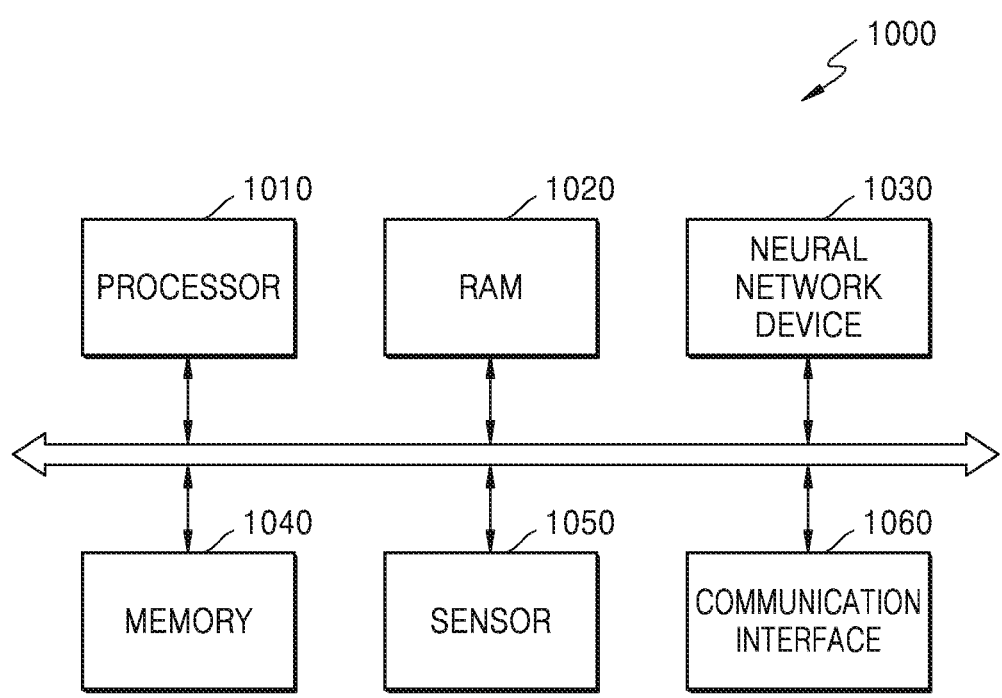
FIG. 11 is a block diagram of an electronic system according to example embodiments.

FIG. 11 is a block diagram of an electronic system 1000 according to example embodiments.

Referring to FIG. 11, the electronic system 1000 may analyze input data in real time based on a neural network, extract valid information, and determine a situation based on the extracted information or control components of an electronic device including the electronic system 1000. For example, the electronic system 1000 may be a robotic device such as a drone, an advanced driver assistance system (ADAS), a smart television (TV), a smart phone, a medical device, a mobile device, an image display device, a measuring device, an Internet of Things (IoT) device, and the like, and may be mounted on any one or any combination of various kinds of electronic devices.

The electronic system 1000 may include a processor 1010, random access memory (RAM) 1020, a neural network device 1030, a memory 1040, a sensor 1050, and a communication interface 1060. The processor 1010 may control an operation of the electronic system 1000. For example, the processor 1010 may control functions of the neural network device 1030 by executing programs stored in the RAM 1020. The RAM 1020 may temporarily store programs, data, or instructions.

The neural network device 1030 may perform an operation of a neural network based on received input data, and may generate an information signal based on the result of the operation. The neural network device 1030 is hardware using a neural network quantized to a fixed-point type, and may correspond to the hardware accelerator described above.

The memory 1040 is a storage area for storing data, and may store, for example, various data generated during computations of the neural network device 1030. The sensor 1050 may sense or receive a signal (e.g., a video signal, an audio signal, a magnetic signal, a biological signal, a touch signal, etc.) from the outside of the electronic device 1000, and may convert the sensed or received signal into data. The communication interface 1060 may have various wired or wireless interfaces capable of communicating with external devices.

As is traditional in the field of the inventive concepts, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the inventive concepts.

While the present disclosure has been shown and described with reference to the example embodiments thereof, it will be understood that various changes in form and details may be made therein without departing from the spirit and scope of the following claims. Descriptions of features or aspects within each example embodiment may be considered as available for other similar features or aspects in other example embodiments.

What is claimed is:

1. A method of generating a fixed-point type neural network by quantizing a floating-point type neural network, the method comprising:
    obtaining, by a device, a plurality of post-activation values by applying an activation function to a plurality of activation values that are received from a layer included in the floating-point type neural network;
    deriving, by the device, a plurality of statistical characteristics for at least some of the plurality of post-activation values;
    determining, by the device, an initial step size for the quantizing of the floating-point type neural network, based on the plurality of statistical characteristics;
    deriving a first fraction length and a second fraction length having different integer values, based on the initial step size, wherein the first fraction length is obtained by rounding up a third fraction length corresponding to the initial step size, and the second fraction length is obtained by rounding down the third fraction length corresponding to the initial step size;
    determining a first step size from the first fraction length;
    determining a second step size from the second fraction length;
    determining a first quantization interval (L1) based on the first step size;
    determining a second quantization interval (L2) based on the second step size;
    determining a first performance measure based on L1;
    determining a second performance measure based on L2;
    selecting, by the device, the first fraction length as a final fraction length for the fixed-point type neural network when the first performance measure provides a lower error than indicated by the second performance measure;
    selecting, by the device, the second fraction length as the final fraction length for the fixed-point type neural network when the first performance measure does not provide the lower error than indicated by the second performance measure; and
    generating the fixed-point type neural network according to the selected final fraction length.

2. The method of claim 1, wherein the deriving of the plurality of statistical characteristics comprises deriving the plurality of statistical characteristics for positive values greater than 0, among the plurality of post-activation values.

3. The method of claim 1, wherein the deriving of the plurality of statistical characteristics comprises, based on the at least some of the plurality of post-activation values, deriving, as the plurality of statistical characteristics, a plurality of parameters to be used to curve-fit a generalized gamma distribution to the at least some of the plurality of post-activation values.

4. The method of claim 3, wherein any one or any combination of the plurality of parameters is derived based on a mean and a variance of the at least some of the plurality of post-activation values.

5. The method of claim 3, wherein the quantizing of the floating-point type neural network is performed based on N quantization levels, N being a natural number of 2 or more, and
    the initial step size between the N quantization levels is determined based on the plurality of statistical characteristics, so that overall distortion of the N quantization levels for a probability density function of the plurality of post-activation values is minimized.

6. The method of claim 5, wherein the initial step size is determined through a closed-form equation based on the N quantization levels and the plurality of parameters.

7. The method of claim 1,
    wherein the determining the first performance measure comprises determining a first overall distortion for a probability density function of the plurality of post-activation values, based on the first fraction length, and
    wherein determining the second performance measure comprises determining a second overall distortion for the probability density function based on the second fraction length.

8. The method of claim 1,
    wherein the determining the first performance measure comprises testing the fixed-point type neural network, based on the first fraction length, to derive a first quantization error, and
    wherein the determining the second performance measure comprises testing the fixed-point type neural network, based on the second fraction length, to derive a second quantization error.

9. The method of claim 1, wherein the quantizing of the floating-point type neural network comprises uniformly quantizing a quantization interval.

10. A non-transitory, computer-readable medium comprising instructions that when executed cause a processor to perform a method of:
    selecting, by a device, a group of a plurality of post-activation values by applying an activation function to a plurality of activation values that are received from a layer of a pre-trained neural network on a floating-point basis;

deriving, by the device, a plurality of parameters for a generalized gamma distribution, based on the group of the plurality of post-activation values;

determining, by the device, an initial step size for the quantizing of a floating-point type neural network, based on the plurality of parameters;

deriving a first fraction length and a second fraction length having different integer values, based on the initial step size, wherein the first fraction length is obtained by rounding up a third fraction length corresponding to the initial step size, and the second fraction length is obtained by rounding down the third fraction length corresponding to the initial step size;

determining a first step size from the first fraction length;

determining a second step size from the second fraction length;

determining a first quantization interval (L1) based on the first step size;

determining a second quantization interval (L2) based on the second step size;

determining a first performance measure based on L1;

determining a second performance measure based on L2;

selecting, by the device, the first fraction length as a final fraction length for a fixed-point type neural network when the first performance measure provides a lower error than indicated by the second performance measure;

selecting, by the device, the second fraction length as the final fraction length for the fixed-point type neural network when the first performance measure does not provide the lower error than indicated by the second performance measure; and generating the fixed-point type neural network according to the selected final fraction length.

11. The non-transitory, computer-readable medium of claim 10, wherein the selecting of the group comprises selecting, as the group of the plurality of post-activation values, positive values greater than 0, among the plurality of post-activation values.

12. The non-transitory, computer-readable medium of claim 10, wherein any one or any combination of the plurality of parameters is derived based on a mean and a variance of the group of the plurality of post-activation values.

13. The non-transitory, computer-readable medium of claim 10, wherein the plurality of parameters is used to curve-fit the generalized gamma distribution to the group of the plurality of post-activation values.

14. A device comprising:

a memory configured to store a program; and a processor configured to generate a fixed-point type neural network by quantizing a floating-point type neural network, by executing the program to:

obtain a plurality of post-activation values by applying an activation function to a plurality of activation values that are received from a layer included in the floating-point type neural network;

derive a plurality of statistical characteristics for at least some of the plurality of post-activation values;

determine, by the device, an initial step size for the quantizing of the floating-point type neural network, based on the plurality of statistical characteristics;

derive a first fraction length and a second fraction length having different integer values, based on the initial step size, wherein the first fraction length is obtained by rounding up a third fraction length corresponding to the initial step size, and the second fraction length is obtained by rounding down the third fraction length corresponding to the initial step size;

determine a first step size from the first fraction length;

determine a second step size from the second fraction length;

determine a first quantization interval (L1) based on the first step size;

determine a second quantization interval (L2) based on the second step size;

determine a first performance measure based on L1;

determine a second performance measure based on L2;

select, by the device, the first fraction length as a final fraction length for the fixed-point type neural network when the first performance measure provides a lower error than indicated by the second performance measure;

select, by the device, the second fraction length as the final fraction length for the fixed-point type neural network when the first performance measure does not provide the lower error than indicated by the second performance measure; and generate the fixed-point type neural network according to the selected final fraction length.

15. The device of claim 14, wherein the processor is further configured to execute the program to, based on positive values greater than 0, among the plurality of post-activation values, derive a plurality of parameters to be used to curve-fit a generalized gamma distribution to the positive post-activation values.

16. The device of claim 15, wherein the quantizing of the floating-point type neural network is performed based on N quantization levels, N being a natural number of 2 or more, and the initial step size between the N quantization levels is determined based on the plurality of statistical characteristics, so that overall distortion of the N quantization levels for a probability density function of the plurality of post-activation values is minimized.

17. The device of claim 16, wherein the initial step size is determined through a closed-form equation based on the N quantization levels and the plurality of parameters.

18. The device of claim 14, wherein the device is an autonomous vehicle, a robot, a smart phone, a tablet device, an augmented reality (IAR) device, or an Internet of Things (IoT) device.

* * * * *